Jan. 16, 1934.    W. A. DEL MAR    1,944,004
ELECTRIC CABLE
Filed March 16, 1932
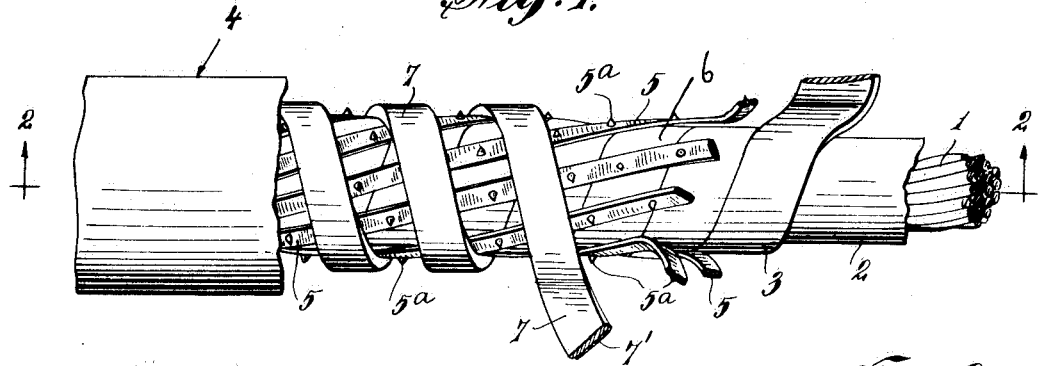
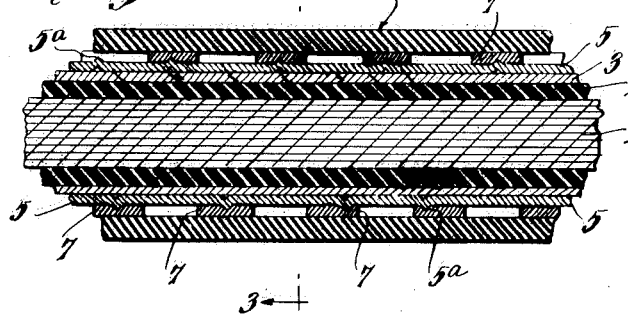  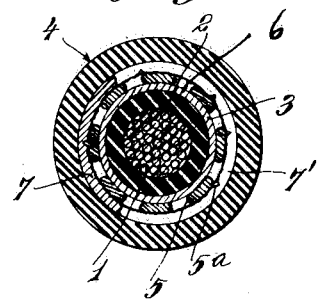
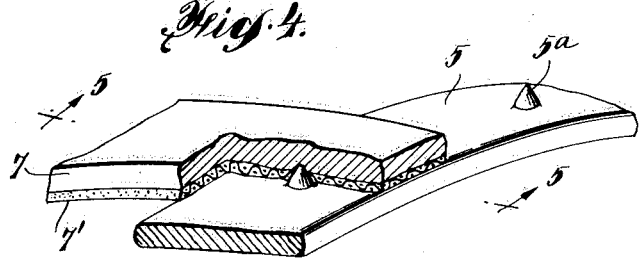  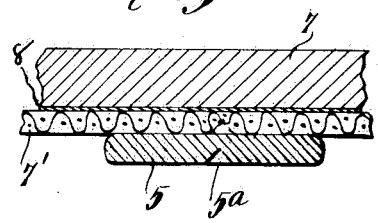
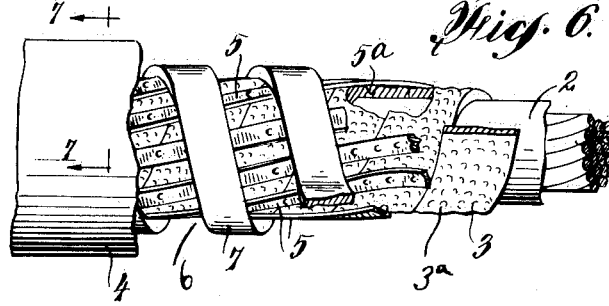  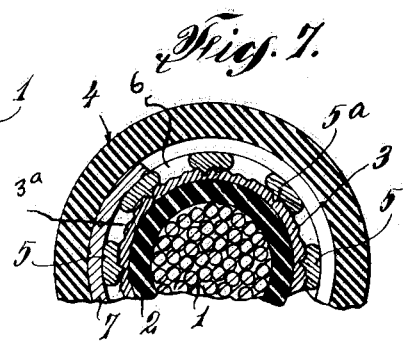
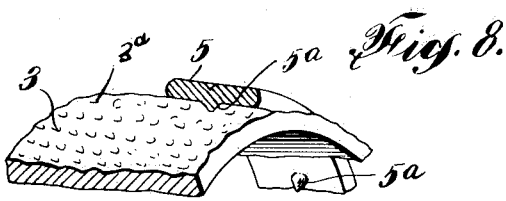
INVENTOR
W<sup>m</sup>. A. Del Mar
BY
ATTORNEY

UNITED STATES PATENT OFFICE 1,944,004

ELECTRIC CABLE

William A. Del Mar, Greenwich, Conn., assignor to Habirshaw Cable and Wire Corporation, New York, N. Y., a corporation of New York Application March 16, 1932. Serial No. 599,266

1 Claim. (Cl. 173—266)

High tension electric cables containing oil have been provided with longitudinal oil channels to permit the free egress and ingress of oil as the oil expands or contracts with various temperatures of the cable. Such cables have been formed with a channel in a cylindrical core in the conductor, or with a pipe in the space between conductors of a multiple-conductor cable. Oil channels have also been proposed either in the lead sheath of the cable or between such sheath and the shielding insulation.

My invention relates to improvements in electric cables of the class referred to, my object being to provide cables with oil channels the walls of which will resist disruption so as not to interfere with the flow of oil through the channels.

My present invention is an improvement in the class of cables set forth in my application filed January 14, 1932, Serial No. 586,567. In carrying out my invention I provide an electric cable having sheath and shield, with multiple strips spaced apart and helically laid over the shield, such strips being held in place by a binder or tape of suitable material wound around said strips, preferably substantially at right angles thereto, and within the outer sheath, said strips being provided with projections that engage a member of the cable, such as the binder or the sheath, to keep the strips from displacement, whereby the channels between the strips will not be deformed or closed by reason of shifting of the strips relatively to one another.

Reference is to be had to the accompanying drawing, wherein,

Fig. 1 is a broken view illustrating my improved cable;

Fig. 2 is a section on line 2, 2 in Fig. 1;

Fig. 3 is a section on line 3, 3 in Fig. 2;

Fig. 4 is a detail perspective view;

Fig. 5 is a section on line 5, 5 in Fig. 4;

Fig. 6 is a broken view illustrating a modification;

Fig. 7 is a section on line 7, 7 in Fig. 6, and

Fig. 8 is a detail perspective of part of Fig. 6.

Similar numerals indicate corresponding parts in the several views.

I have illustrated an electric cable made in a convenient or well-known form comprising conductor 1 (which may comprise single or multiple wires) having suitable insulation, at 2, and enclosed within a shield 3, such as copper, and finally an outer sheath 4, such as lead, applied in a well-known way. Between the shield and the sheath, as illustrated, I wind spaced strips or separators 5, helically laid, preferably in a long lay, providing channels 6 extending along the shielded conductor between the shield and sheath 4. The strips or separators 5 are held tightly in place by a binder tape or band 7 which is helically wound around the strips 5, preferably at substantially right angles thereto, and preferably in a relatively short helical lay, the binder tape or band being located between the strips 5 and the sheath 4. The tapes or separators 5 may be laid in even spaced relation during the manufacture of the cable, and may be immediately held in place by the binder tape or band 7 therearound.

The strips or separators 5 may be of paper fiber, fabric, metal or other suitable material adapted to have projections or millings 5a extending therefrom to engage the binder 7 or the shield 3. The projections 5a may be pressed out from the strips 5 in any desired way, such as by passing the strips between roller dies having complementary projecting and re-entrant parts to press out the projections. The projections 5 are suitably spaced apart along the strips or separators 5 to engage the binder or the shield at suitable places.

In the form shown in Figs. 1 to 5 the projections 5a from the strips 5 extend outwardly and engage the binder tape or band 7 to resist displacement of the strips. The binder 7 may be of suitable material, such as paper, cloth or metal, which will receive the projections 5a that may enter or pierce the binder, (Fig. 2). The inner surface of the binder 7 may be milled, or roughened, such as by securing a strip of open mesh fabric, 7', to the binder tape 7, as illustrated on an exaggerated scale in Fig. 5.

The projections 5a may project from the inner surface of the strips 5 to engage the shield 3, as illustrated in Figs. 6, 7 and 8. In this case the surface of the shield 3 may be milled, roughened, serrated or striated, such as indicated at 3a, to be engaged by the projections 5a, to keep the strips 5 from displacement.

In accordance with my invention the strips or separators, which form the side walls of the channels 6, (the channels being defined by the shield, the sheath and the strips), are kept from displacement and are maintained in proper condition for the flow of insulating oil through the channels, because the otherwise flexible walls of the channel, formed by the strips 5, might become displaced and thereby reduce the width of the channels, which might occur during winding or unwinding and straightening of the cable. With my improvement the side walls of the channels are retained substantially in the original spacing, and the cable may be freely manipulated without danger of obstruction to the flow of oil through the channels 6.

Having now described my invention what I claim is:

An electric cable comprising an insulated conductor, spaced strips extending lengthwise outside of the insulated conductor providing channels between the strips along the insulated conductor, a binder around the strips, and a sheath around the binder, said strips having projections engaging the binder to prevent displacement of the strips, the binder being provided with a fabric mesh to engage the projections from the strips.

WILLIAM A. DEL MAR.